United States Patent Office 3,372,307
Patented Mar. 5, 1968

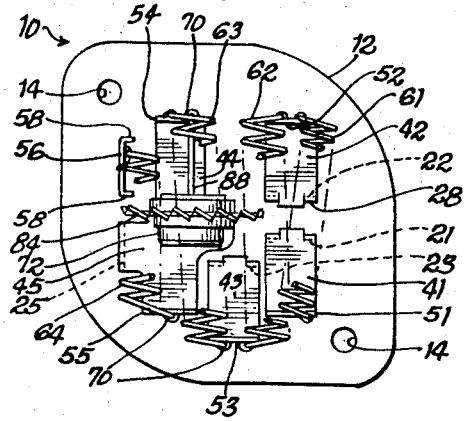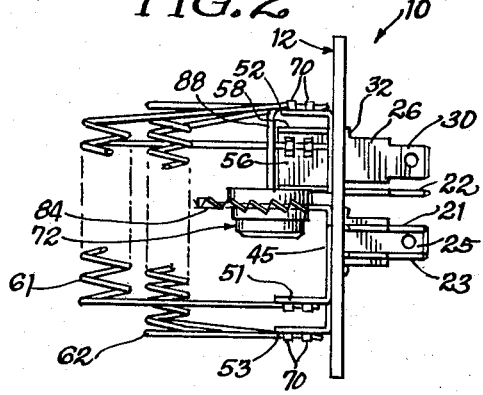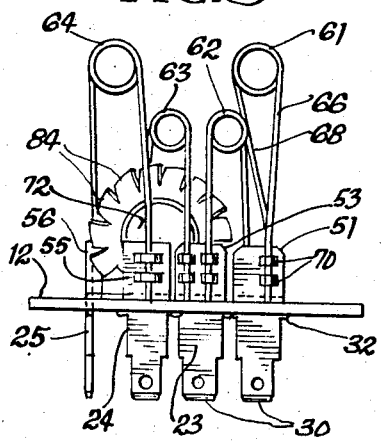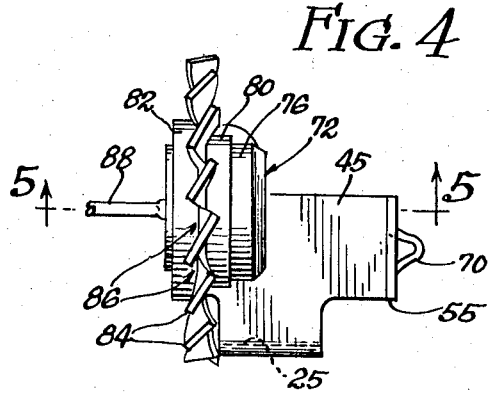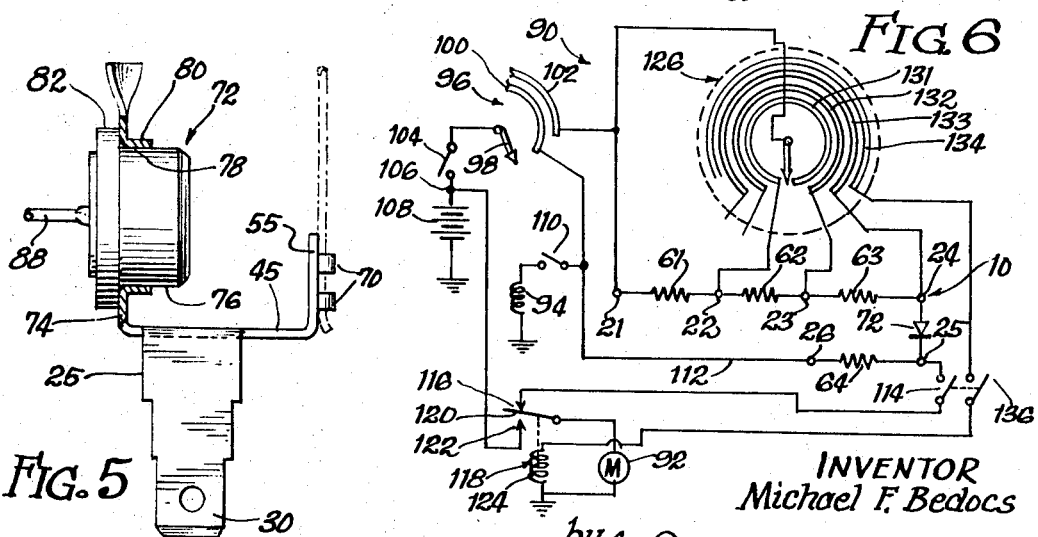

3,372,307
RESISTOR AND RECTIFIER UNIT
Michael F. Bedocs, Wilmette, Ill., assignor to Indak Manufacturing Corp., Northbrook, Ill., a corporation of Illinois
Filed Dec. 23, 1965, Ser. No. 516,009
10 Claims. (Cl. 317—100)

This invention relates to electrical devices which may include resistors and rectifiers for regulating the speed of a motor or some other similar device.

One object of the present invention is to provide a new and improved electrical unit comprising one or more resistors and at least one rectifier or diode.

A further object is to provide such a unit in which the diode and at least one of the resistors are mounted upon and supported by a terminal member or bracket of new and improved construction.

It is a further object to provide such an electrical unit in which the terminal member comprises means for supporting the rectifier, means for dissipating the heat generated in the rectifier during use, and means for supporting one of the resistors.

Another object is to provide such a new and improved electrical unit which is sturdy and capable of withstanding long service yet is of extremely low cost.

Further objects and advantages of the present invention will appear from the following description, taken with the accompanying drawings, in which:

FIG. 1 is an elevational view of a resistor and rectifier unit to be described as an illustrative embodiment of the invention.

FIG. 2 is another elevational view taken at right angles to the elevational view of FIG. 1.

FIG. 3 is a plan view of the unit of FIG. 1.

FIG. 4 is an enlarged elevational view of the terminal member which supports the rectifier in the unit of FIG. 1.

FIG. 5 is another elevational view of the terminal member, partly in section along the line 5—5 in FIG. 4.

FIG. 6 is a schematic circuit diagram showing one application of the resistor and rectifier unit of FIG. 1.

As already indicated, the drawings illustrate a resistor and rectifier unit 10 which may be employed in a circuit to control the speed of a motor or to perform other similar control functions. The illustrated unit 10 is intended particularly for use in a system to control the blower motor of an automotive heating and air-conditioning system. However, it will be understood that the unit will find many other applications.

As illustrated, the resistor and rectifier unit 10 comprises a supporting board or member 12 made of insulating material. The board 12 is intended particularly to be mounted over a hole in the air duct of the heating and air-conditioning system. Thus, holes 14 are provided in the insulating board 12 to receive mounting screws or other fasteners.

A plurality of terminal bars or members are mounted on the insulating board 12. In this case, the board 12 is provided with six such terminal members 21–26. A plurality of slots 28 are formed in the insulating board 12 to receive the terminals 21–26. It will be seen that the terminal members 21 extend through the slots 28 and project forwardly from the insulating board 12, substantially at right angles thereto. At their front ends, the terminal members 21–26 are formed with prongs 30 which are adapted to receive a suitable connector or receptacle, for connecting the resistor and rectifier unit into the desired circuit. The terminals 21–26 are securely fastened to the insulating board 12 preferably by staking or upsetting the edge portions 32 of the terminals, against the front of the board 12.

Behind the insulating board 12, the first five terminal members 21–25 are preferably bent at right angles to provide base plate portions 41–45 which engage the rear side of the board. Thus, one end of each base plate portion connects integrally with the terminal member which extends through the corresponding slot in the insulating board 12. Terminal lugs or flanges 51–55 are bent rearwardly from the base plate portions 41–45 at points which are spaced from the terminal members 21–25.

The sixth terminal member 26 is formed with an integral terminal lug 56 which projects rearwardly from the insulating board 12. The lug 56 is formed with longitudinal flanges 58 along its opposite edges, and thus is generally in the shape of a shallow channel. The flanges 58 engage the rear side of the insulating board 12 and assist in retaining the terminal member 26 on the insulating board.

A plurality of resistors are connected between the various terminal lugs 51–56. In this case, four such resistors 61–64 are provided. It will be seen that the resistor 61 is connected between the terminal lugs 51 and 52. The resistor 62 extends between the lugs 52 and 53. The opposite ends of the resistor 63 are connected to the lugs 53 and 54. Finally, the resistor 64 is connected between the lugs 55 and 56.

The resistors 61–64 are preferably in the form of open coils of resistance wire. Each coil has a pair of end leads 66 and 68 which form the sole support for the coil. It will be evident that the end leads 66 and 68 of the coils are securely fastened to the corresponding terminal lugs 51–56. Preferably, each of the terminal lugs 51–56 is provided with loops 70 for receiving each of the corresponding end leads 66 and 68 of the coils. The loops 70 are struck from the terminal lugs 51–56. After the end leads have been inserted, the loops are securely clinched or compressed so that the leads will be tightly clamped against the terminal lugs. Two such loops are preferably provided for each of the end leads.

The illustrated resistor and rectifier unit 10 comprises a rectifier or diode 72 which in this case is connected between the terminals 24 and 25. To support the rectifier 72, a flange or bracket 74 is preferably bent rearwardly from the base plate portion 45 of the terminal member 25. As shown, the rectifier 72 has a cylindrical casing 76 which is mounted in an opening 78 formed in the flange 74. A mounting sleeve 80 is formed on the flange 74 around the opening 78 to receive the cylindrical casing 76. Preferably, the fit between the casing 76 and the sleeve 80 is made extremely tight so that the casing 76 must be pressed into the sleeve 80. As indicated in FIG. 5, the outside of the casing 76 is preferably knurled or otherwise roughened so that the casing will be securely retained in the sleeve 80. The casing 76 has an annular enlarged portion 82 which is engageable with the flange 74.

The terminal flange 74 is preferably provided with means for dissipating or radiating the heat generated within the rectifier during use. In the illustrated construction, such means comprise a plurality of blades or fins 84 which are formed integrally with the terminal flange 74. As shown, the fins 84 radiate outwardly from the portion of the flange 74 around the mounting sleeve 80. Preferably, the fins 84 are formed by slitting or shearing the flange 74. The fins 84 are then twisted to provide openings or slots 86 between the fins. It will be seen that the fins 84 provide a generally circular fringe around the mounting sleeve 80 for the rectifier 72.

Preferably, the casing 76 is employed as one terminal of the rectifier 72 and thus is connected to the terminal member 25. The other terminal of the illustrated rectifier 72 is in the form of a lead or wire 88 which may be connected to one of the other terminal members. In the illustrated construction, the lead 88 is securely fastened to the terminal lug 55, preferably by being clinched within a pair of the loops 70, in the same manner as the end leads of the resistors 61–65.

FIG. 6 shows an example of a circuit 90 to which the resistor and rectifier assembly 10 may be applied. This particular circuit provides a control system for an automotive heating or air-conditioning unit. The system is capable of regulating the speed of a blower motor 92, while also controlling the energization of a clutch solenoid 94 in an air-conditioning compressor. It will be understood that the compressor is driven when the solenoid 94 is energized. The motor 92 operates the blower which circulates air through the heating and air-conditioning system.

The details of the circuit 90 may be varied but will be of interest to illustrate an application of the resistor and rectifier unit 10. The illustrated system 90 comprises a selector switch 96 having a contactor 98 which is movable successively into engagement with two contact segments 100 and 102. An On-Off switch 104 is connected between the contactor 98 and the ungrounded terminal 106 of the automotive battery 108. The switch 104 may constitute the ignition switch for the automobile.

A control switch 110 is connected between the contact segment 100 and the ungrounded end of the clutch solenoid 94. The switch 110 may be thermostatically controlled so that the switch will be closed when the temperature in the automobile needs to be reduced by the air-conditioning system.

A lead 112 is preferably connected between the contact segment 100 and the terminal 26 of the resistor and rectifier unit 10. It will be recalled that the resistor 64 is connected between the terminals 25 and 26. In this case the terminal 25 is connected through an On-Off switch 114 to one contact 116 of a relay 118. It will be seen that the relay 118 comprises a movable contactor or armature 120 which is movable between the contact 116 and the contact 122. The relay 118 comprises a coil or solenoid 124 which may be energized to cause such movement of the armature 120. It will be seen that the armature 120 is connected to the ungrounded side of the blower motor 92.

It will be recognized that the blower motor 92 may be operated at a fixed relatively low speed by means of the circuit just described. Such circuit may be traced from the battery 108 through the switch 104, the contactor 98, the contact segment 100, the lead 112, the resistor 64, the switch 114, the relay contact 116 and the armature 120 to the motor 92.

The other contact segment 102 is preferably connected to the terminal 21 of the resistor and rectifier unit 10. It will be seen that the resistors 61–63 and the rectifier 72 form a series circuit between the terminals 21 and 25. Thus, additional current to energize the motor 92 will be supplied through the resistors 61–63 and the rectifier 72 when the contactor 98 engages the contact segment 102.

A control switch 126 is preferably provided to short-circuit the successive resistors 61–63 so as to increase the speed of the blower motor 92. The control switch 126 may be operated by an automatic control unit in accordance with the need for heat in the automobile. It will be seen that the switch 126 comprises a contactor 128 which is engageable successively with a plurality of contact segments 131, 132, 133 and 134. In this case, the contact segments 131–133 are connected to the terminals 22–24, respectively, of the resistor and rectifier unit 10.

Thus, when the contactor 128 engages the contact segment 131, the resistor 61 is short-circuited. When the contactor 128 engages the contact segment 132, the resistors 61 and 62 are short-circuited. Similarly, all three resistors 61–63 are short-circuited when the contactor 128 engages the contact segment 133. For this position of the switch 126, the resistance of the rectifier 72 is still in series with the blower motor 92.

In the illustrated circuit, the fourth contact segment 134 of the control switch 126 is connected through an On-Off switch 136 to the ungrounded side of the relay coil 124. The On-Off switches 114 and 136 are preferably ganged together to form a master On-Off switch. When the relay coil 124 is energized, the armature 120 is moved against the relay contact 122, which is preferably connected directly to the ungrounded side of the battery 108. Thus, the full battery voltage is applied to the blower motor 92 when the relay coil 124 is energized.

The rectifier 72 prevents reverse passage of electrical current between the terminals 25 and 24, for conditions in which the switch contactor 98 engages the contact 100, but not the contact 102. Such reverse passage of current might cause unwanted energization of the relay coil 124, because such reverse current, if permitted, could in some cases pass from the terminal 24 through the control switch 126 to the relay coil 124. The rectifier 72 isolates the switch 126 and the resistors 61–63 from the current which arrives at the terminal 25 by way of the resistor 64, so that such spurious operation of the relay coil 124 cannot occur.

When the rectifier 72 is conducting current to the blower motor 92, considerable heat is generated in the rectifier. However, the heat is dissipated by the fins or blades 84 on the terminal flange 74, so that the temperature of the rectifier is prevented from rising to a level that would damage the rectifier. The fins or blades 84 also assist in the dissipation of the heat generated by the resistors 61–64, particularly the heat which is conducted to the terminal lug 55 by the end lead of the resistor 64.

The illustrated resistors 61–64 are all generally parallel to one another and are disposed outwardly from the rectifier 72. In particular, the resistors 63 and 64 are directly opposite the rectifier 72 and are spaced outwardly therefrom. The resistor 62 also extends past a portion of the terminal flange 74 on which the fins 84 are formed. The action of the fins 84 in dissipating heat from the rectifier 72 makes it possible to mount the rectifier in close proximity to the resistors 61–64. Thus, a particularly compact and efficient arrangement is provided, yet at extremely low cost.

Various other modifications, alternative constructions and equivalents may be employed without departing from the true spirit and scope of the invention, as exemplified in the foregoing description and defined in the following claims.

I claim:
1. In an electrical unit,
the combination comprising an insulating board,
a plurality of terminal bars mounted on said board,
one of said terminal bars having a base portion mounted on said board,
a prong portion bent substantially at right angles from said base portion and extending through said board,
and a flange portion bent substantially at right angles from said base portion and away from said board,
said flange portion having a substantially circular opening therein,
a rectifier having a casing mounted in said opening,
said flange having a plurality of fins radiating from said flange around said opening for dissipating the heat generated in said rectifier,
and a resistor extending adjacent said flange and connected between said one terminal bar and another of said terminal bars,
said rectifier having a lead thereon connected to still another of said terminal bars.
2. A combination according to claim 1,
in which said flange portion is formed with an integral sleeve extending around said opening, said casing of said rectifier being securely fitted into said sleeve.

3. A combination according to claim 1, in which said base portion is formed with a terminal lug bent substantially at right angles thereto and away from said insulating board, one end of said resistor being connected to said terminal lug.

4. In an electrical device, the combination comprising an insulating support, a plurality of terminal members mounted on said support, one of said terminal members having a flange thereon projecting away from said support, said flange having a substantially circular opening therein, a rectifier having a casing securely mounted in said opening, said flange having a plurality of fins thereon radiating from said flange around said opening for dissipating the heat generated in said rectifier during use.

5. A combination according to claim 4, in which said flange is formed with a sleeve portion extending around said opening, said casing of said rectifier being securely fitted into said sleeve.

6. A combination according to claim 4, in which said rectifier comprises a lead connected to another of said terminal members.

7. A combination according to claim 4, in which said one terminal member is formed with a terminal lug spaced from said flange and projecting away from said insulating support, and an electrical resistor connected between said lug and another of said terminal members.

8. A combination according to claim 4, in which said flange comprises slits therein formed between said fins, said fins being twisted to afford openings therebetween.

9. A combination according to claim 4, in which said one terminal member comprises a base member formed integrally with said flange and a terminal lug formed integrally with said base member and projecting away from said insulating support in spaced relation to said flange, and a coil of resistance wire extending adjacent said flange and having one end connected to said terminal lug, the other end of said coil being connected to another of said terminal members.

10. A combination according to claim 9, in which said rectifier comprises a lead connected to still another of said terminal members.

References Cited

UNITED STATES PATENTS

| | | | |
|---|---|---|---|
| 2,884,505 | 4/1959 | Strain et al. | 323—74 X |
| 3,195,628 | 7/1965 | McAdam | 165—185 |
| 3,200,296 | 8/1965 | Bruestle | 317—100 |

JOHN F. COUCH, *Primary Examiner.*

WARREN E. RAY, *Examiner.*